US006989421B2

(12) United States Patent
Grady

(10) Patent No.: US 6,989,421 B2
(45) Date of Patent: Jan. 24, 2006

(54) TWO COMPONENT COATING COMPOSITIONS AND COATINGS PRODUCED THEREFROM

(75) Inventor: Michael Charles Grady, Oaklyn, NJ (US)

(73) Assignee: E. I. duPont deNemours and Company, Wilmington, DE (US)

( * ) Notice: Subject to any disclaimer, the term of this patent is extended or adjusted under 35 U.S.C. 154(b) by 73 days.

(21) Appl. No.: 10/612,495

(22) Filed: Jul. 2, 2003

(65) Prior Publication Data

US 2005/0004321 A1   Jan. 6, 2005

(51) Int. Cl.
*C08F 8/30* (2006.01)

(52) U.S. Cl. ............... 525/123; 525/326.2; 525/327.3; 525/328.2; 525/328.8; 525/328.9; 525/330.3; 525/330.5; 525/374; 525/375; 525/381; 525/382; 525/385; 525/386

(58) Field of Classification Search ............... 525/123, 525/326.2, 327.3, 328.2, 328.8, 328.9, 330.3, 525/330.5, 374, 375, 381, 382, 385, 386
See application file for complete search history.

(56) References Cited

U.S. PATENT DOCUMENTS

| 5,098,956 | A | * | 3/1992 | Blasko et al. ............... 525/123 |
| 5,279,862 | A | | 1/1994 | Corcoran et al. |
| 5,286,782 | A | | 2/1994 | Lamb et al. |
| 5,314,953 | A | | 5/1994 | Corcoran et al. |
| 6,221,494 | B1 | | 4/2001 | Barsotti et al. |

* cited by examiner

Primary Examiner—Bernard Lipman
(74) Attorney, Agent, or Firm—Sudhir G. Deshmukh

(57) ABSTRACT

The present invention is directed to two component coating compositions that cure under ambient conditions and more particularly to those having low VOC (volatile organic content) that are suitable for use in automotive refinish and Original Equipment Manufacturing (OEM) applications. The coating composition includes crosslinkable and crosslinking components, wherein the crosslinkable component includes a low polydispersity, low molecular weight copolymer having on an average 2 to 25 crosslinkable functional groups, such as hydroxyl, acetoacetoxy, carboxyl, epoxy, primary amine and secondary amine. The copolymer is polymerized from a monomer mixture that includes one or more non-functional methacrylate monomers and one or more functional acrylate monomers provided with the functional groups. The crosslinking component includes polyisocyanate, polyamine, epoxy, polyacid, ketimine, melamine, or a combination thereof. The invention is also directed to coating produced from the coating composition.

22 Claims, No Drawings

TWO COMPONENT COATING COMPOSITIONS AND COATINGS PRODUCED THEREFROM

FIELD OF INVENTION

This invention generally relates to curable coating compositions used in automotive refinish and Original Equipment Manufacturing (OEM) applications and it particularly relates to two component coating compositions that cure under ambient conditions and more particularly to those compositions having low VOC (volatile organic content).

BACKGROUND OF THE INVENTION

A number of clear and pigmented coating compositions are utilized in various coatings, such as, for example, basecoats and clearcoats used in automotive refinish coatings, which are generally solvent based.

In repairing damage, such as dents to auto bodies, the original coating in and around the damaged area is typically sanded or ground out by mechanical means. Some times the original coating is stripped off from a portion or off the entire auto body to expose the bare metal underneath. After repairing the damage, the repaired surface is coated, preferably with low VOC coating compositions, typically in portable or permanent low cost painting enclosures vented to atmosphere to remove the organic solvents from the freshly applied paint coatings in a safe manner from the standpoint of operator health and explosion hazard. Typically, the drying and curing of the freshly applied paint takes place within these enclosures. Furthermore, the foregoing drying and curing steps take place within the enclosure to also prevent the wet paint from collecting dirt in the air or other contaminants.

As these paint enclosures take up significant floor space of typical small auto body paint repair shops, these shops prefer to dry and cure these paints as fast as possible. More expensive enclosures are frequently provided with heat sources, such as conventional heat lamps located inside the enclosure to cure the freshly applied paint at accelerated rates. Therefore, to provide more cost effective utilization of shop floor space and to minimize fire hazards resulting from wet coatings from solvent based coating compositions, there exists a continuing need for fast curing coating formulations which cure under ambient conditions while still providing outstanding performance characteristics particularly chip resistance, mar-resistance, durability and appearance.

In the past, several approaches have been used to improve the productivity of isocyanate crosslinked coatings. One approach was based on using higher Tg acrylic polymers (U.S. Pat. Nos. 5,279,862 and 5,314,953) and another on the use of reactive oligomers (U.S. Pat. No. 6,221,494 B1). Due to the high Mw and high Tg of such acrylic polymers, the fast dry was achievable, but the film vitrified and the faster cure was not achievable. The viscosity of these types of acrylic polymers was also comparatively high and thus that approach resulted in higher VOC. The reactive oligomer approach improved the appearance and the rate of cure of the coating at lower VOC, however these oligomers are difficult to make at high enough Tg needed to reduce the dry time. Moreover, the higher the amount of these oligomers in the coating compositions, the lower was the hardness of the resultant coatings.

Thus, a continuing need still exists for a coating composition that cures under ambient conditions, more particularly those compositions having low VOC.

STATEMENT OF THE INVENTION

The present invention is directed to a coating composition comprising crosslinkable and crosslinking components, wherein said crosslinkable component comprises:

a copolymer having on an average 2 to 25 crosslinkable groups selected from the group consisting of hydroxyl, acetoacetoxy, carboxyl, epoxy, primary and secondary amine, and a combination thereof; a weight average molecular weight ranging from about 1000 to 4500; a polydispersity ranging from about 1.05 to 2.5; wherein said copolymer is polymerized from a monomer mixture comprising one or more non-functional methacrylate monomers and one or more functional acrylate monomers provided with said functional groups, and wherein said crosslinking component for said crosslinkable groups is selected from the group consisting of polyisocyanate, polyamine, ketimine, melamine, epoxy, polyacid and a combination thereof.

The present invention is further directed to a process for producing a coating on a substrate, said process comprises:

a) mixing a crosslinkable and crosslinking components of a coating composition to form a potmix, wherein said crosslinkable component comprises:

a copolymer having on an average 2 to 25 crosslinkable groups selected from the group consisting of hydroxyl, acetoacetoxy, carboxyl, epoxy, primary and secondary amine, and a combination thereof; a weight average molecular weight ranging from about 1000 to 4500; a polydispersity ranging from about 1.05 to 2.5; wherein said copolymer is polymerized from a monomer mixture comprising one or more non-functional methacrylate monomers and one or more functional acrylate monomers provided with said functional groups, and wherein said crosslinking component for said crosslinkable groups is selected from the group consisting of polyisocyanate, polyamine, ketimine, melamine, epoxy, polyacid and a combination thereof;

b) applying a layer of said potmix on said substrate;

c) curing said layer into said coating on said substrate.

DETAILED DESCRIPTION OF THE PREFERRED EMBODIMENT

As Used Herein:

"Two-pack coating composition" means a thermoset coating composition having two components stored in separate containers. The containers containing the two components are typically sealed to increase the shelf life of the components of the coating composition. The components are mixed just prior to use to form a pot mix, which has a limited pot life, typically ranging from a few minutes (15 minutes to 45 minutes) to a few hours (4 hours to 8 hours). The pot mix is applied as a layer of a desired thickness on a substrate surface, such as an auto body. After application, the layer dries and cures at ambient or elevated temperatures to form a coating on the substrate surface having desired coating properties, such as, high gloss, mar-resistance and resistance to environmental etching.

"Low VOC coating composition" means a coating composition that includes the range of from 0.1 kilograms (1.0 pounds per gallon) to 0.72 kilograms (6.0 pounds per gallon), preferably 0.3 kilograms (2.6 pounds per gallon) to 0.6 kilograms (5.0 pounds per gallon) and more preferably 0.34 kilograms (2.8 pounds per gallon) to 0.53 kilograms (4.4 pounds per gallon) of the solvent per liter of the coating composition. All VOC's determined under the procedure provided in ASTM D3960.

"High solids composition" means a coating composition having solid component of above 30 percent, preferably in the range of from 35 to 90 percent and more preferably in the range of from 40 to 80 percent, all in weight percentages based on the total weight of the composition.

"GPC weight average molecular weight" means a weight average molecular weight measured by utilizing gel permeation chromatography. A high performance liquid chromatograph (HPLC) supplied by Hewlett-Packard, Palo Alto, Calif. was used. Unless stated otherwise, the liquid phase used was tetrahydrofuran and the standard was polymethyl methacrylate or polystyrene.

"Tg" (glass transition temperature) measured in °C. determined by DSC (Differential Scanning Calorimetry).

"Polydispersity" means GPC weight average molecular weight divided by GPC number average molecular weight. The lower the polydispersity (closer to 1), the narrower will be the molecular weight distribution, which is desired.

"(Meth)acrylate" means acrylate and methacrylate.

"Polymer solids" or "Binder solids" means a polymer or binder in its dry state.

"Crosslinkable component" means a component that includes a compound, polymer or copolymer having functional crosslinkable groups positioned in the backbone of the polymer, pendant from the backbone of the polymer, terminally positioned on the backbone of the polymer, or a combination thereof. One of ordinary skill in the art would recognize that certain crosslinkable group combinations would be excluded from the crosslinkable component of the present invention, since, if present, these combinations would crosslink among themselves (self-crosslink), thereby destroying their ability to crosslink with the crosslinking groups in the crosslinking components defined below.

"Crosslinking component" is a component that includes a compound, polymer or copolymer having crosslinking groups positioned in the backbone of the polymer, pendant from the backbone of the polymer, terminally positioned on the backbone of the polymer, or a combination thereof, wherein these groups are capable of crosslinking with the crosslinkable groups on the crosslinkable component (during the curing step) to produce a coating in the form of crosslinked structures. One of ordinary skill in the art would recognize that certain crosslinking group/crosslinkable group combinations would be excluded from present invention, since they would fail to crosslink and produce the film forming crosslinked structures.

In coating application, especially the automotive refinish application, a key driver is productivity, i.e., the ability of a layer of a coating composition to dry rapidly to a tack free state and then cure sufficiently rapidly to a buffable state. However, the productivity is adversely impacted by the increasingly stricter environmental considerations, which require coating compositions to have lower VOCs. The present invention addresses the forgoing issues by utilizing crosslinking technology. Thus, the present coating composition includes a crosslinkable and crosslinking component.

The crosslinkable component includes a copolymer having on an average 2 to 25, preferably 3 to 15, more preferably 4 to 12 crosslinkable groups selected from the group consisting of hydroxyl, acetoacetoxy, carboxyl, epoxy, primary and secondary amine, and a combination thereof. The hydroxyl, acetoacetoxy and secondary amine functional groups are preferred and hydroxyl is more preferred. It would be clear to one ordinary skill in the art that certain combinations would be excluded from the foregoing as they tend to self-crosslink. Therefore, a combination of carboxyl, primary or secondary amine and epoxy as crosslinkable groups would be excluded from the forgoing combinations. The weight average molecular weight of the copolymer ranges from about 1000 to 4500, preferably from 1250 to 3700 and more preferably from 1500 to 3500, a polydispersity ranging from about 1.05 to 2.5, preferably ranging from 1.1 to 2.0 and more preferably ranging from 1.1 to 1.7. The Tg of the copolymer can range from about −10° C. to 80° C., preferably from about 0° C. to 65° C. and more preferably from about 10° C. to 60° C.

The copolymer is polymerized from a monomer mixture of one or more non-functional methacrylate monomers and one or more functional acrylate monomers. The ratio of the non-functional methacrylate monomers to the functional acrylate monomers in the monomer mixture ranges from about 90:10::10:90, preferably from about 25:75::75:25. Generally, the monomer mixture includes 100% to 60%, preferably 100% to 80% of the total amount of the non-functional methacrylate monomers and functional acrylate monomers, all percentages being in weight percent based on the weight of the monomer mixture.

The use of non-functional methacrylate monomers and functional acrylate monomers in the monomer mixture by the polymerization process described below ensures functionality on almost every copolymer chain, with low levels of non-functional chains of preferably less than 1% and mono-functional polymer chains of preferably less than 5%, even at these low molecular weights, the percentages being based on of the total number of chains. By contrast, using the commonly practiced random polymerization techniques; the conventional copolymers at these low molecular weights would typically have unacceptable functionality distribution and contain high levels of undesirable non-functional and mono-functional polymer chains. Generally, the presence of non-functional and mono-functional polymer chains in coating compositions reduces the crosslinking of the crosslinkable functionalities with the crosslinking functionalities and results in poor coating properties, such as low crosslink density, high soluble fraction, low hardness, poor adhesion; and poor chip and humidity resistance.

More particularly, when the copolymers of the present invention have a Tg of greater than 10° C. by using suitably appropriate monomers, the resulting coating composition has desirable application viscosity, reactivity and functionality in almost every polymer chain. As a result, a coating from such a composition has improved cure time and desirable coating properties, such as coating hardness. Since the presence of the copolymer in coating compositions provides a desirable balance of coating properties, much higher levels of these copolymers can be included in the coating compositions. As a result, the VOC of the resulting composition, as compared to those containing conventional reactive oligomers, can be lowered without affecting coating properties.

The non-functional methacrylate monomer can be provided with one or more groups selected from the group consisting of linear $C_1$ to $C_{20}$ alkyl, branched $C_3$ to $C_{20}$ alkyl, cyclic $C_3$ to $C_{20}$ alkyl, aromatic with 2 to 3 rings, phenyl, $C_1$ to $C_{20}$ fluorocarbon and a combination thereof. The functional acrylate monomer is provided with one or more groups selected from the group consisting of hydroxyl, acetoacetoxy, primary amine, secondary amine, carboxyl, epoxy and a combination thereof.

Some of the one or more non-functional methacrylate monomers in the monomer mixture include methyl methacrylate, ethyl methacrylate, propyl methacrylate, butyl methacrylate, pentyl methacrylate, hexyl methacrylate, octyl methacrylate, nonyl methacrylate, isodecyl methacrylate, and lauryl methacrylate; branched alkyl monomers, such as isobutyl methacrylate, t-butyl methacrylate and 2-ethylhexyl methacrylate; and cyclic alkyl monomers, such as cyclohexyl methacrylate, methylcyclohexyl methacrylate, trimethylcyclohexyl methacrylate, tertiarybutylcyclohexyl methacrylate and isobornyl methacrylate. Isobornyl methacrylate and iso-butyl methacrylate are preferred.

Some of the specific functional acrylate monomers in the monomer mixture can include hydroxyalkyl acrylates, such as hydroxyethyl acrylate, hydroxy propyl acrylate, hydroxyisopropyl acrylate, hydroxybutyl acrylate; glycidyl acrylate; acrylic acid; acetoacetoxyethyl acrylate and aminoalkyl acrylates, such as tertiarybutylaminoethyl acrylate and N-methylaminoethyl acrylate. Hydroxyethyl acrylate and hydroxybutyl acrylate are preferred.

The monomer mixture can also further include small amounts, typically ranging from 0.01% to 10% by weight of functional methacrylate monomers provided enough functional acrylate monomers are present in the monomer mixture to ensure the presence of the aforedescribed functionalities on each polymer chain. All percentages based on the total weight of the monomer mixture.

The monomer mixture can also further include small amounts, typically ranging from 0.01% to 10% by weight of non-functional acrylate monomers, for example butyl acrylate, provided enough functional acrylate monomers are present in the monomer mixture to ensure the presence of a functionality on each polymer chain.

The monomer mixture can also include one or more of other monomers for the purpose of achieving the desired properties, such as hardness, appearance and mar resistance. Some of the other such monomers include, for example, styrene, α-methyl styrene, acrylonitrile and methacrylonitrile. When included, preferably, the monomer mixture includes such monomers in the range of 5% to 30%, all percentages being in weight percent based on the total weight of the monomer mixture. Styrene is preferred.

If desired one or more silane functionalities can be incorporated into the copolymers of the present invention preferably by post reacting hydroxyl functionalities on the copolymer with isocyanatopropyl trimethoxy silane. The reaction is conducted on an equivalent basis with equivalents of isocyanate, from the isocyanatopropyl trimethoxy silane, to hydroxyl groups, on the copolymer, ranging from 0.01 to 1.0.

One of the processes of producing the copolymer of the present invention includes free radically solution polymerizing the aforedescribed monomer mixture at a polymerization temperature ranging from 120° C. to 300° C., preferably ranging from 150° C. to 200° C. and more preferably ranging from 160° C. to 200° C. Typically the reactor gage pressure ranges from 0.1 to 2.86 MPa (0 to 400 psig), preferably from 0.1 to 0.71 MPa (0 to 100 psig). It is understood that the higher the polymerization temperature, the higher will be the reactor pressure for a given composition of monomers and solvent. Typically, the monomer mixture is solvated in a polymerization medium, which typically includes one or more organic solvents, such as methyl amyl ketone, Aromatic 100 from ExxonMobil Chemical, Houston, Tex. and butyl acetate. Thus, the higher the boiling point of the polymerization medium, the higher can be the polymerization temperature. Typical reaction time ranges from about 1 hour to 6 hours, generally from about 2 hours to 4 hours.

The polymerization of the monomer mixture can be initiated by preferably simultaneously adding conventional thermal initiators, such as Azos exemplified by Vazo® 64 supplied by DuPont Company, Wilmington, Del.; and peroxides, such as t-butylperoxy acetate. By adjusting the amount of initiator used and the reaction temperature, the molecular weight of the resulting copolymer of the present invention can be adjusted. Thus, to attain the same molecular weight, the lower the polymerization temperature, the more will be the amount of the initiator needed. Typically, to attain the claimed molecular weight range, at high polymerization temperatures (higher than 150° C.) about 0.1% to about 6% of initiator is used, all percentages being in weight percent based on the weight of the monomer mixture. Conversely, at low polymerization temperatures (lower than 150° C.) about 4% to about 12% of initiator is used, all percentages being in weight percent based on the weight of the monomer mixture. Another approach to lowering the molecular weight of the copolymer includes polymerizing the monomer mixture under very dilute conditions. Thus, using the same amount of the initiator, a copolymer made at 70 weight percent solids will have higher molecular weight than a copolymer made at 10 to 20 weight percent solids.

One of the processes for incorporating acetoacetoxy functionalities in the copolymer can be to post react some or all of the hydroxyl functionalities on the copolymer with tertiary butyl acetoacetate.

The crosslinking component of the present invention suitable for crosslinking with the crosslinkable groups present in the copolymer in the crosslinking component is selected from the group consisting of polyisocyanate, polyamine, ketimine, melamine, epoxy, polyacid and a combination thereof. It would be clear to one ordinary skill in the art that generally certain combinations of crosslinking groups from crosslinking components crosslink with crosslinkable groups from the crosslinkable components. Some of those paired combinations include:

1. Ketimine crosslinking component generally crosslinks with acetoacetoxy crosslinkable groups.
2. Polyisocyanate and melamine crosslinking components generally crosslink with hydroxyl, primary and secondary amine crosslinkable groups.
3. Epoxy crosslinking component generally crosslinks with carboxyl, primary and secondary amine crosslinkable groups.
4. Polyamine crosslinking component generally crosslinks with acetoacetoxy crosslinkable groups.
5. Polyacid crosslinking component generally crosslinks with epoxy crosslinkable groups.

However, it should be noted that combinations of the foregoing paired combinations could also be used.

Typically, the polyisocyanate is provided with in the range of 2 to 10, preferably 2.5 to 8, more preferably 3 to 5 isocyanate functionalities. Generally, the ratio of equivalents of isocyanate functionalities on the polyisocyanate per equivalent of the functional group of the copolymer ranges from 0.5/1 to 3.0/1, preferably from 0.7/1 to 1.8/1, more preferably from 0.8/1 to 1.3/1. Some suitable polyisocyanates include aromatic, aliphatic, or cycloaliphatic polyisocyanates, trifunctional polyisocyanates and isocyanate functional adducts of a polyol and difunctional isocyanates. Some of the particular polyisocyanates include diisocyanates, such as 1,6-hexamethylene diisocyanate, isophorone diisocyanate, 4,4'-biphenylene diisocyanate, toluene diisocyanate, biscyclohexyl diisocyanate, tetramethyl-m-xylylene diisocyanate, ethyl ethylene diisocyanate, 1-methyltrimethylene diisocyanate, 1,3-phenylene diisocyanate, 1,5- napthalene diisocyanate, bis-(4-isocyanatocyclohexyl)-methane and 4,4'-diisocyanatodiphenyl ether.

Some of the suitable trifunctional polyisocyanates include triphenylmethane triisocyanate, 1,3,5-benzene triisocyanate, and 2,4,6-toluene triisocyanate. Trimers of diisocyanate, such as the trimer of hexamethylene diisocyanate sold under the trademark Desmodur® N-3390 by Bayer Corporation of Pittsburgh, Pa. and the trimer of isophorone diisocyanate are also suitable. Furthermore, trifunctional adducts of triols and diisocyanates are also suitable. Trimers of diisocyanates are preferred and trimers of isophorone and hexamethylene diisocyanates are more preferred.

Some of the suitable melamines include monomeric melamine, polymeric melamineIformaldehyde resin or a combination thereof. The coating composition can include in the range of from 0.1 percent to 40%, preferably in the range of from 15% to 35%, and most preferably in the range of 20 percent to 30 percent of the melamine, the percentages being in weight percentages based on the total weight of composition solids. The monomeric melamines include low molecular weight melamines which contain, on an average, three or more methylol groups etherized with a $C_1$ to $C_5$ monohydric alcohol such as methanol, n-butanol, or isobutanol per triazine nucleus, and have an average degree of condensation up to about 2 and preferably in the range of about 1.1 to about 1.8, and have a proportion of mononuclear species not less than about 50 percent by weight. By contrast the polymeric melamines have an average degree of condensation of more than 1.9. Some such suitable monomeric melamines include alkylated melamines, such as methylated, butylated, isobutylated melamines and mixtures thereof. Many of these suitable monomeric melamines are supplied commercially. For example, Cytec Industries Inc., West Patterson, N.J. supplies Cymel® 301 (degree of polymerization of 1.5,95% methyl and 5% methylol), Cymel® 350 (degree of polymerization of 1.6,84% methyl and 16% methylol), 303, 325, 327 and 370, which are all monomeric melamines. Suitable polymeric melamines include high imino (partially alkylated, —N, —H) melamine known as Resimene® BMP5503 (molecular weight 690, polydispersity of 1.98, 56% butyl, 44% imino), which is supplied by Solutia Inc., St. Louis, Mo., or Cymel® 1158 provided by Cytec Industries Inc., West Patterson, N.J. Cytec Industries Inc. also supplies Cymel® 1130 @ 80 percent solids (degree of polymerization of 2.5), Cymel® 1133 (48% methyl, 4% methylol and 48% butyl), both of which are polymeric melamines.

Ketimines useful in the present invention are typically prepared by the reaction of ketones with amines. Representative ketones, which may be used to form the ketimine, include acetone, methyl ethyl ketone, methyl isopropyl ketone, methyl isobutyl ketone, diethyl ketone, benzyl methylketone, diisopropyl ketone, cyclopentanone, and cyclohexanone. Representative amines which may be used to form the ketimine include ethylene diamine, ethylene triamine, propylene diamine, tetramethylene diamine, 1,6-hexamethylene diamine, bis(6-aminohexyl)ether, tricyclodecane diamine, N,N'-dimethyldiethyltriamine, cyclohexyl-1,2,4-triamine, cyclohexyl-1,2,4,5-tetraamine, 3,4,5-triaminopyran, 3,4-diaminofuran, and cycloaliphatic diamines. Preparation and other suitable imines are shown in U.S. Pat. No. 6,297,320, incorporated herein by reference. It should be noted that when the copolymer contains only acetoacetoxy functional groups, then ketimine is typically utilized as a crosslinking component.

Suitable polyamines include primary and secondary amines, such as, ethylenediamine, propylenediamine, butylenediamine, pentamethylenediamine, hexamethylenediamine, decamethylenediamine, 4,7-dioxadecane-1,10-diamine, dodecamethylenediamine, 4,9-dioxadodecane-1,12-diamine, 7-methyl-4,10-dioxatridecane-1,13-diamine, 1,2-diaminocyclohexane, 1,4-diaminocyclohexane, 4,4'-diminodicyclohexyl methane, isophorone diamine, bis(3-methyl-4-aminocyclohexyl)methane, 2,2-bis(4-aminocyclohexyl)propane, nitrile tris(ethane amine), bis(3-aminopropyl)methylamine, 3-amino-1-(methylamino) propane, 3-amino-1-(cyclohexylamino)propane, and N-(2-hydroxyethyl)ethylene diamine. Ethylenediamine, propylenediamine, butylenediamine and 1,2-diaminocyclohexane are preferred.

Suitable epoxy crosslinking components contain at least two glycidyl groups and can be an oligomer or a polymer, such as sorbitol polyglycidyl ether, mannitol polyglycidyl ether, pentaerythritol polyglycidol ether, glycerol polyglycidyl ether, low molecular weight epoxy resins, such as epoxy resins of epichlorohydrin and bisphenol A., di- and polyglycidyl esters of acids, polyglycidyl ethers of isocyanurates, such as Denacol® EX301 from Nagase. Sorbitol polyglycidyl ether, such as Araldite XYGY-358® from Ciba-Geigy, and di- and polyglycidyl esters of acids, such as Araldite CY-184® from Ciba-Geigy, are preferred since they form high quality finishes.

Suitable polyacid crosslinking components include aliphatic acids, such as succinic, maleic, fumaric, glutaric, adipic, azeleic, and sebacic acids; cycloaliphatic polycarboxylic acids, such as tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, tricyclodecanedicarboxylic acid, cyclohexanetetracarboxylic acid and cyclobutanetetracarboxylic acid; aromatic polycarboxylic acids, such as phthalic acid, isophthalic acid, terephthalic acid, halogenophthalic acids, such as, tetrachloro- or tetrabromophthalic acid, trimellitic acid, and pyromellitic acid. It should be noted that aromatic acid crosslinkers tend to be less durable in clearcoats than aliphatic and cycloaliphatic acid crosslinkers.

The coating composition preferably includes a catalytic amount of a catalyst for accelerating the curing process. Generally, in the range of about 0.001 percent to about 5 percent, preferably in the range of from 0.005 percent to 2 percent, more preferably in the range of from 0.01 percent to 1 percent of the catalyst is utilized, all in weight percent based on the total weight of crosslinkable and crosslinking component solids. A wide variety of catalysts can be used, such as, tin compounds, including dibutyl tin dilaurate and dibutyl tin diacetate; tertiary amines, such as, triethylenediamine. These catalysts can be used alone or in conjunction with carboxylic acids, such as, acetic acid. One of the commercially available catalysts, sold under the trademark, Fastcat® 4202 dibutyl tin dilaurate by Elf-Atochem North America, Inc. Philadelphia, Pa., is particularly suitable.

When the crosslinking component includes melamine, it also preferably includes one or more acid catalysts to further enhance the crosslinking of the components on curing. Generally, the coating composition includes in the range of from 0.1 percent to 5 percent, preferably in the range of from 0.1 to 2 percent, more preferably in the range of from 0.5 percent to 2 percent and most preferably in the range of from 0.5 percent to 1.2 percent of the catalyst, the percentages being in weight percentage based on the total weight of composition solids. Some suitable catalysts include the conventional acid catalysts, such as aromatic sulfonic acids, for example dodecylbenzene sulfonic acid, para-toluenesulfonic acid and dinonyinaphthalene sulfonic acid, all of which are either unblocked or blocked with an amine, such as dimethyl oxazolidine and 2-amino-2-methyl-1-propanol, n,n-dimethylethanolamine or a combination thereof. Other acid catalysts that can be used are strong acids, such as phosphoric acids, more particularly phenyl acid phosphate, which may be unblocked or blocked with an amine.

The crosslinkable component of the present invention can further include in the range of from 0.1 percent to 95 percent, preferably in the range of from 10 percent to 90 percent, more preferably in the range of from 20 percent to 80 percent and most preferably in the range of 30 percent to 70 percent, all based on the total weight of the crosslinkable component of an additional acrylic polymer, a polyester or a combination thereof. Applicants have discovered that by adding one or more of the foregoing polymers to the crosslinkable component, the coating composition resulting therefrom provides coating with improved sag resistance, and flow and leveling properties.

The additional acrylic polymer suitable for use in the present invention can have a GPC weight average molecular weight exceeding 5000, preferably in the range of from 5000 to 20,000, more preferably in the range of 6000 to 20,000, and most preferably in the range of from 8000 to 12,000. The Tg of the acrylic polymer varies in the range of from 0° C. to 100° C., preferably in the range of from 30° C. to 80° C.

The additional acrylic polymer suitable for use in the present invention can be conventionally polymerized from typical monomers, such as alkyl (meth)acrylates having alkyl carbon atoms in the range of from 1 to 18, preferably in the range of from 1 to 12 and styrene and functional monomers, such as, hydroxyethyl acrylate and hydroxyethyl methacrylate.

The polyester suitable for use in the present invention can have a GPC weight average molecular weight exceeding 1500, preferably in the range of from 1500 to 100,000, more preferably in the range of 2000 to 50,000, still more preferably in the range of 2000 to 8000 and most preferably in the range of from 2000 to 5000. The Tg of the polyester varies in the range of from −50° C. to +100° C., preferably in the range of from −20° C. to +50° C.

The polyester suitable for use in the present invention can be conventionally polymerized from suitable polyacids, including cycloaliphatic polycarboxylic acids, and suitable polyols, which include polyhydric alcohols. Examples of suitable cycloaliphatic polycarboxylic acids are tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid and cyclobutanetetracarboxylic acid. The cycloaliphatic polycarboxylic acids can be used not only in their cis but also in their trans form and as a mixture of both forms. Examples of suitable polycarboxylic acids, which, if desired, can be used together with the cycloaliphatic polycarboxylic acids, are aromatic and aliphatic polycarboxylic acids, such as, for example, phthalic acid, isophthalic acid, terephthalic acid, halogenophthalic acids, such as, tetrachloro- or tetrabromophthalic acid, adipic acid, glutaric acid, azelaic acid, sebacic acid, fumaric acid, maleic acid, trimellitic acid, and pyromellitic acid.

Suitable polyhydric alcohols include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol; dipentaerythritol, tris(hydroxyethyl) isocyanate, polyethylene glycol and polypropylene glycol. If desired, monohydric alcohols, such as, for example, butanol, octanol, lauryl alcohol, ethoxylated or propoxylated phenols may also be included along with polyhydric alcohols. The details of polyester suitable for use in the present invention are further provided in the U.S. Pat. No. 5,326,820, which is incorporated herein by reference. One commercially available polyester, which is particularly preferred, is SCD®-1040 polyester, which is supplied by Etna Product Inc., Chagrin Falls, Ohio.

The crosslinkable component of the present invention can be blended with reactive oligomers covered in U.S. Pat. No. 6,221,494, which incorporated herein by reference and non-alicyclic (linear or aromatic) oligomers, if desired. Such non-alicyclic-oligomers can be made by using non-alicyclic anhydrides, such as succinic or phthalic anhydrides, or mixtures thereof. Caprolactone oligomers described in U.S. Pat. No. 5,286,782, incorporated herein by reference, can also be used.

The coating composition of the present invention can optionally contain, in the range of from 0.1 percent to 50 percent, a modifying resin, such as non-aqueous dispersion (NAD), all percentages being based on the total weight of composition solids. The weight average molecular weight of the modifying resin generally varies in the range of from 20,000 to 100,000, preferably in the range of from 25,000 to 80,000 and more preferably in the range from 30,000 to 50,000.

The non-aqueous dispersion-type polymer is prepared by dispersion polymerizing at least one vinyl monomer in the presence of a polymer dispersion stabilizer and an organic solvent. The polymer dispersion stabilizer may be any of the known stabilizers used commonly in the field of non-aqueous dispersions.

The coating composition can optionally include in the range of from 0.1 percent to 30 percent, preferably in the range of from 5 percent to 25 percent, more preferably in the range of from 10 percent to 20 percent, all in weight percentages based on the total weight of components solids, additional crosslinkers, such as aldimine and polyaspartic esters. Aldimines useful in the present invention may be prepared from aldehydes, such as acetaldehyde, formaldehyde, propionaldehyde, isobutyraldehyde, n-butyraldehyde, heptaldehyde and cyclohexyl aldehydes by reaction with amine. Representative amines which may be used to form the aldimine include ethylene diamine, ethylene triamine, propylene diamine, tetramethylene diamine, 1,6-hexamethylene diamine, bis(6-aminohexyl)ether, tricyclodecane diamine, N,N'-dimethyldiethyltriamine, cyclohexyl-1,2,4-triamine, cyclohexyl-1,2,4,5-tetraamine, 3,4,5-triaminopyran, 3,4-diaminofuran, and cycloaliphatic diamines.

Polyaspartic esters useful in the present invention are typically prepared by the reaction of diamines, such as, isophorone diamine with dialkyl maleates, such as, diethyl maleate.

The foregoing polyaspartic ester and selected aldimines are supplied commercially under the trademark Desmophen® amine co-reactants by Bayer Corporation, Pittsburgh, Pa. Suitable catalyst for the crosslink reaction of aldimine and aspartic ester with acetoxy functionality is sold under the trademark Amicure® TEDA from Air Products & Chemicals, Allentown, Pa.

The crosslinkable or crosslinking component of coating composition of the present invention, typically contains at least one organic solvent which is typically selected from the group consisting of aromatic hydrocarbons, such as, petroleum naphtha or xylenes; ketones, such as, methyl amyl ketone, methyl isobutyl ketone, methyl ethyl ketone or acetone; esters, such as, butyl acetate or hexyl acetate; and glycol ether esters. such as propylene glycol monomethyl ether acetate. The amount of organic solvent added depends upon the desired solids level as well as the desired amount of VOC of the composition. If desired, the organic solvent may be added to both components of the binder. High solids and low VOC coating composition is preferred.

The coating composition of the present invention can also contain conventional additives, such as, pigments, metallic flakes, hollow glass beads, UV absorbers, stabilizers, rheology control agents, flow agents, reinforcing fibers, toughening agents and fillers. Such additional additives will, of course, depend upon the intended use of the coating composition. Fillers, pigments, and other additives that would adversely affect the clarity of the cured coating are typically not included if the composition is intended as a clear coating. It is understood that one or more of these conventional additives, such as pigments, can be added before, during or at the end of the agitating step.

To improve weatherability of the coating from the coating composition, about 0.1 to 5% by weight, based on the weight of the composition solids, of an ultraviolet light stabilizer or a combination of ultraviolet light stabilizers and absorbers may be added. These stabilizers include ultraviolet light absorbers, screeners, quenchers and specific hindered amine light stabilizers. Also, about 0.1 to 5% by weight, based on the weight of the composition solids, of an antioxidant can be added. Most of the foregoing stabilizers are supplied by Ciba Specialty Chemicals, Tarrytown, N.Y.

The coating composition of the present invention can be formulated in the form of a clear coating composition, pigmented composition, metallized coating composition, basecoat composition, monocoat composition or a primer. The present formulations are particularly useful as a clear coating for outdoor articles, such as automobile and other vehicle body parts. The substrate is generally prepared with a primer and or a color coat or other surface preparation prior to coating with the present compositions.

The present invention is also directed to a method of producing a coating on a substrate. The coating composition of the present invention can be supplied in the form of a two-pack coating composition. Generally, the crosslinkable component and the crosslinking component are mixed-typically just prior to application to form a pot mix. The mixing can take place though a conventional mixing nozzle or separately in a container. A layer of the pot mix generally having a thickness in the range of 15 micrometers to 200 micrometers is applied over a substrate, such as an automotive body or an automotive body that has precoated layers, such as electrocoat primer. The foregoing application step can be conventionally accomplished by spraying, electrostatic spraying, roller coating, dipping or brushing the pot mix over the substrate. The layer after application is typically dried to reduce the solvent content from the layer and then cured at temperature ranging from ambient to 204° C. Under typical automotive OEM applications, the dried layer of the composition can be typically cured at elevated temperatures ranging from 60° C. to 160° C. in about 10 to 60 minutes. Preferably, for automotive refinish applications curing can take place at about ambient to 60° C., and for heavy-duty truck body applications it can take place at about 60° C. to 80° C. The cure under ambient conditions occurs in about 30 minutes to 24 hours, generally in about 30 minutes to 4 hours to form, a coating on the substrate having the desired coating properties. It is further understood that the actual curing time can depend upon the thickness of the applied layer, the cure temperature, humidity and on any additional mechanical aids, such as fans, that assist in continuously flowing air over the coated substrate to accelerate the cure rate. It is understood that actual curing temperature would vary depending upon the catalyst and the amount thereof, thickness of the layer being cured and the amount of the crosslinking component utilized.

The suitable substrates for applying the coating composition of the present invention include automobile bodies, any and all items manufactured and painted by automobile sub-suppliers, frame rails, commercial trucks and truck bodies, including but not limited to beverage bodies, utility bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, pleasure vehicles, pleasure craft snow mobiles, all terrain vehicles, personal watercraft, bicycles, motorcycles, boats, and aircraft. The substrate further includes industrial and commercial new construction and maintenance thereof; cement and wood floors; walls of commercial and residential structures, such office buildings and homes; amusement park equipment; concrete surfaces, such as parking lots and drive ways; asphalt and concrete road surface, wood substrates, marine surfaces; outdoor structures, such as bridges, towers; coil coating; railroad cars; printed circuit boards; machinery; OEM tools; signage; fiberglass structures; sporting goods; and sporting equipment.

EXAMPLES

Test Procedures

Swell Ratio

The swell ratio of a free film (removed from a sheet of TPO-thermoplastic olefin) was determined by swelling the film in methylene chloride. The free film was placed between two layers of aluminum foil and using a LADD punch, a disc of about 3.5 mm in diameter was punched out of the film and the foil was removed from the film. The diameter of the unswollen film ($D_o$) was measured using a microscope with a 10× magnification and a filar lens. Four drops of methylene chloride were added to the film and the film was allowed to swell for a few seconds and then a glass slide was placed over the film and the swollen film diameter ($D_s$) was measured. The swell ratio was then calculated as follow:

$$\text{Swell ratio} = (D_S)^2/(D_O)^2$$

The lower the swell ratio, the higher is the crosslink density.

Persoz Hardness Test

The change in film hardness of the coating was measured with respect to time by using a Persoz hardness tester Model No. 5854 (ASTM D4366), supplied by Byk-Mallinckrodt, Wallingford, Conn. The numbers of oscillations (referred to as Persoz number) were recorded.

Hardness (Fischer)

Hardness was measured using a Fischerscope® hardness tester (the measurement is in Newtons per square millimeter).

Cotton Tack Free Time

Allow coated panel to dry for set period of time (e.g. 30 minutes). Drop a cotton ball from a height of 1 inch onto the surface of the panel and leave the cotton ball on the surface for a set time interval and invert panel. Repeat above until the time the cotton ball drops off the panel on inversion and note that as the cotton tack free time.

BK Dry Time

Surface drying times of coated panels measured according to ASTM D5895.

Gel Fraction

Measured according to the procedure set forth in U.S. Pat. No. 6,221,494, column 8, line 56 to column 9, line 2, which procedure is hereby incorporated by reference.

MEK Rubs

A coated panel is rubbed (100 times) with an MEK (methyl ethyl ketone) soaked cloth using a rubbing machine and any excess MEK is wiped off. The panel is rated from 1–10. Rating 10—no visible damage to the coating, rating 9—1–3 distinct scratches, rating 8—4–6 distinct scratches, rating 7—7–10 distinct scratches, rating 6—10–15 distinct scratches with slight pitting or slight loss of color, rating 5—15–20 distinct scratches with slight to moderate pitting or moderate loss of color, rating 4—scratches start to blend into one another, rating 3—only a few undamaged areas between blended scratches, rating 2—no visible signs of undamaged paint, rating 1 complete failure—bare spots are shown. The final rating is obtained by multiplying the number of rubs by the rating.

Water Spot Test

Water spot rating is a measure of how well the film is crosslinked early in the curing of the film. If water spot damage is formed on the film, this is an indication that the cure is not complete and further curing of the film is needed before the film can be wet sanded or buffed or moved from the spray both. The water spot rating is determined in the following manner.

Coated panels are laid on a flat surface and deionized water was applied with a pipette at 1 hour-timed intervals. A drop about ½ inch in diameter was placed on the panel and allowed to evaporate. The spot on the panel was checked for deformation and discoloration. The panel was wiped lightly with cheesecloth wetted with deionized water, which was followed by lightly wiping the panel dry with the cloth. The panel was then rated on a scale of 1 to 10. Rating of 10 best—no evidence of spotting or distortion of discoloration, rating 9—barely detectable, rating 8—slight ring, rating 7—very slight discoloration or slight distortion, rating 6—slight loss of gloss or slight discoloration, rating 5—definite loss of gloss or discoloration, rating of 4—slight etching or definite distortion, rating of 3—light lifting, bad etching or discoloration, rating of 2—definite lifting and rating of 1—dissolving of the film.

Copolymer 1

To a 1-liter flask fitted with heating mantle, stirrer, monomer and initiator feed lines, an initial solvent charge of 268.4 grams of xylene was added. The solvent was heated to 190° C. under 2.5 bar pressure. A monomer mixture (IBMA/HEA 70/30) of 2489.9 g of isobutyl methacrylate (IBMA from Lucite International, Inc. Cordova, Tenn.), 1067.1 g of hydroxyl ethyl acrylate (Rorcryl 420® HEA from Rohm and Haas, Philadelphia, Pa.) and 33.3 g of xylene as solvent was added to the flask over a period of 240 minutes in such a way that the level in the 1-liter flask was held constant at 0.55 liters and the reactor effluent was fed to an attached 12 liter flask fitted with heating mantle, stirrer, water cooled condenser with nitrogen purge and initiator feed line. Simultaneously with the monomer feed, a mixture of 14.5 g of tert-butylperoxy acetate (Luperox® 7M75 initiator from Atofina, Philadelphia, Pa.) and 803.4 g of xylene was added over a period of 240 minutes. Polymerization temperature of 190° C. was maintained over the entire reaction time. After completion of the feeds to the 1-liter flask, the flask was drained over 25 minutes into the 12-liter flask. Once transfer from the 1-liter flask to the 12-liter flask began, the 12-liter flask was heated to reflux at 140° C. Thirty-four minutes after the transfer from the 1-liter flask to the 12-liter flask began, 1.9 g of tert-butyl peroxy acetate (Luperox® 7M75 initiator from Atofina, Philadelphia, Pa.) and 12.0 g of xylene were added all at once to the 12-liter flask. Directly thereafter, 17.5 g of tert-butyl peroxy acetate (Luperox® 7M75 initiator from Atofina, Philadelphia, Pa.) and 108.4 g of xylene were fed to the 12-liter reactor over 220 minutes. Once the initiator feed was complete, an additional 19.4 g of Luperox® 7M75 initiator and 139.1 g of xylene were fed over half an hour. The 12-liter flask was held at reflux for 1 hour and cooled to 80° C. An additional 84.6 g of xylene were added to the 12-liter flask and the batch filled out.

The resulting copolymer@ 65.3% solids had a GPC Mn of 2099 and GPC Mw of 2991. The copolymer had an average number of 2.6 hydroxyl groups from the hydroxy ethyl acrylate per polymer chain. The Tg of the copolymer was −16.5° C., using dynamic scanning calorimetry.

Copolymer 2

To a 1-liter flask fitted with heating mantle, stirrer, monomer and initiator feed lines, an initial solvent charge of 268.4 grams of xylene was added. The solvent was heated to 190° C. under 2.5 bar pressure. A monomer mixture (IBOMA/IBMA/HEA 35/35/30) of 1244.9 g of isobornyl methacrylate (AGEFLEX® IBOMA from CIBA Specialty Chemicals, High Point, N.C.), 1244.9 g of isobutyl methacrylate (IBMA from Lucite International, Inc. Cordova, Tenn.), 1067.1 g of hydroxy ethyl acrylate (Rorcryl 420® HEA from Rohm and Haas, Philadelphia, Pa.) and 33.3 g of xylene as solvent was added to the flask over a period of 240 minutes in such a way that the level in the 1-liter flask was held constant at 0.55 liters and the reactor effluent was fed to an attached 12 liter flask fitted with heating mantle, stirrer, water cooled condenser with nitrogen purge and initiator feed line. Simultaneously with the monomer feed, a mixture of 14.5 g of tert-butylperoxy acetate (Luperox® 7M75 initiator from Atofina, Philadelphia, Pa.) and 803.4 g of xylene was added over a period of 240 minutes. Polymerization temperature of 190° C. was maintained over the entire reaction time. After completion of the feeds to the 1-liter flask, the flask was drained over 25 minutes into the 12-liter flask. Once transfer from the 1-liter flask to the 12-liter flask began, the 12-liter flask was heated to reflux at 140° C. Thirty-four minutes after the transfer from the 1-liter flask to the 12-liter flask began, 1.9 g of tert-butylperoxy acetate (Luperox® 7M75 initiator from Atofina, Philadelphia, Pa.) and 12.0 g of xylene were added all at once to the 12-liter flask. Directly thereafter, 17.5 g of tert-butylperoxy acetate (Luperox® 7M75 initiator from Atofina, Philadelphia, Pa.) and 108.4 g of xylene were fed to the 12-liter reactor over 220 minutes. Once the initiator feed was complete, an additional 19.4 g of Luperox® 7M75 initiator and 139.1 g of xylene were fed over half an hour. The 12-liter flask was held at reflux for 1 hour and cooled to 80° C. An additional 84.6 g of xylene were added to the 12-liter flask and the batch filled out.

The resulting copolymer@ 65.3% solids had a GPC Mn of 1986 and GPC Mw of 2735. The copolymer had an average number of 2.6 hydroxyl groups from the hydroxyethyl acrylate per polymer chain. The Tg of the copolymer was 5.0° C., using dynamic scanning calorimetry.

Copolymer 3

To a 1-liter flask fitted with heating mantle, stirrer, monomer and initiator feed lines, an initial solvent charge of 268.4 grams of xylene was added. The solvent was heated to 175° C. under 2.5 bar pressure. A monomer mixture (IBOMA/HEA 70/30) of 2489.8 g of isobornyl methacrylate (AGEFLEX® IBOMA from CIBA Specialty Chemicals, High Point, N.C.) and 1067.1 g of hydroxy ethyl acrylate (Rorcryl 420® HEA from Rohm and Haas, Philadelphia, Pa.) and 33.3 g of xylene as solvent was added to the flask over a period of 240 minutes in such a way that the level in the 1-liter flask was held constant at 0.55 liters and the reactor effluent was fed to an attached 12 liter flask fitted with heating mantle, stirrer, water cooled condenser with nitrogen purge and initiator feed line. Simultaneously with the monomer feed, a mixture of 14.5 g of tert-butylperoxy acetate (Luperox® 7M75 initiator from Atofina, Philadelphia, Pa.) and 803.4 g of xylene was added over a period of 240 minutes. Polymerization temperature of 190° C. was maintained over the entire reaction time. After completion of the feeds to the 1-liter flask, the flask was drained over 25 minutes into the 12-liter flask. Once transfer from the 1-liter flask to the 12-liter flask began, the 12-liter flask was heated to reflux at 140° C. Thirty-four minutes after the transfer from the 1-liter flask to the 12-liter flask began, 1.9 g of tert-butylperoxy acetate (Luperox® 7M75 initiator from Atofina, Philadelphia, Pa.) and 12.0 g of xylene were added all at once to the 12-liter flask. Directly thereafter, 17.5 g of tert-butylperoxy acetate (Luperox® 7M75 initiator from Atofina, Philadelphia, Pa.) and 108.4 g of xylene were fed to the 12-liter reactor over 220 minutes. Once the initiator feed was complete, an additional 19.4 g of Luperox® 7M75 initiator and 139.1 g of xylene were fed over half an hour. The 12-liter flask was held at reflux for 1 hour and cooled to 80° C. An additional 84.6 g of xylene were added to the 12-liter flask and the batch filled out.

The resulting copolymer@ 65.6% solids had a GPC Mn of 1935 and GPC Mw of 2656. The copolymer had an average number of 2.6 functional groups of hydroxyethyl acrylate per polymer chain. The Tg of the copolymer was 38.6° C., using dynamic scanning calorimetry.

Copolymer 4

To a 1-liter flask fitted with heating mantle, stirrer, monomer and initiator feed lines, an initial solvent charge of 268.4 grams of xylene was added. The solvent was heated to 175° C. under 2.5 bar pressure. A monomer mixture (MMA/HEA 70/30) of 2489.8 g of methyl methacrylate (MMA from Lucite International, Inc. Cordova, Tenn.), 1067.1 g of hydroxy ethyl acrylate (Rorcryl 420® HEA from Rohm and Haas, Philadelphia, Pa.) and 33.3 g of xylene as solvent was added to the flask over a period of 240 minutes in such a way that the level in the 1-liter flask was held constant at 0.55 liters and the reactor effluent was fed to an attached 12 liter flask fitted with heating mantle, stirrer, water cooled condenser with nitrogen purge and initiator feed line. Simultaneously with the monomer feed, a mixture of 14.5 g of tert-butylperoxy acetate (Luperox® 7M75 initiator from Atofina, Philadelphia, Pa.) and 803.4 g of xylene was added over a period of 240 minutes. Polymerization temperature of 190° C. was maintained over the entire reaction time. After completion of the feeds to the 1-liter flask, the flask was drained over 25 minutes into the 12-liter flask. Once transfer from the 1-liter flask to the 12-liter flask began, the 12-liter flask was heated to reflux at 140° C. Thirty-four minutes after the transfer from the 1-liter flask to the 12-liter flask began, 1.9 g of tert-butylperoxy acetate (Luperox® 7M75 initiator from Atofina, Philadelphia, Pa.) and 12.0 g of xylene were added all at once to the 12-liter flask. Directly thereafter, 17.5 g of tert-butylperoxy acetate (Luperox® 7M75 initiator from Atofina, Philadelphia, Pa.) and 108.4 g of xylene were fed to the 12-liter reactor over 220 minutes. Once the initiator feed was complete, an additional 19.4 g of Luperox® 7M75 initiator and 139.1 g of xylene were fed over half an hour. The 12-liter flask was held at reflux for 1 hour and cooled to 80° C. An additional 84.6 g of xylene were added to the 12-liter flask and the batch filled out.

The resulting copolymer@ 65.7% solids had a GPC Mn of 2683 and GPC Mw of 4198. The copolymer had an average number of 2.6 functional groups of hydroxyethyl acrylate per polymer chain. The Tg of the copolymer was 27.1° C., using dynamic scanning calorimetry.

Copolymer 5

To a 1-liter flask fitted with heating mantle, stirrer, monomer and initiator feed lines, an initial solvent charge of 268.4 grams of xylene was added. The solvent was heated to 185° C. under 3.5 bar pressure. A monomer mixture (MMA/HEA 70/30) of 2489.8 g of methyl methacrylate (MMA from Lucite International, Inc. Cordova, Tenn.), 1067.1 g of hydroxy ethyl acrylate (Rorcryl 420® HEA from Rohm and Haas, Philadelphia, Pa.) and 33.3 g of xylene as solvent was added to the flask over a period of 240 minutes in such a way that the level in the 1-liter flask was held constant at 0.55 liters and the reactor effluent was fed to an attached 12 liter flask fitted with heating mantle, stirrer, water cooled condenser with nitrogen purge and initiator feed line. Simultaneously with the monomer feed, a mixture of 14.6 g of tert-butylperoxy acetate (Luperox® 7M75 initiator from Atofina, Philadelphia, Pa.) and 803.4 g of xylene was added over a period of 240 minutes. Polymerization temperature of 190° C. was maintained over the entire reaction time. After completion of the feeds to the 1-liter flask, the flask was drained over 25 minutes into the 12-liter flask. Once transfer from the 1-liter flask to the 12-liter flask began, the 12-liter flask was heated to reflux at 140° C. Thirty-four minutes after the transfer from the 1-liter flask to the 12-liter flask began, 1.9 g of tert-blutylperoxy acetate (Luperox® 7M75 initiator from Atofina, Philadelphia, Pa.) and 12.0 g of xylene were added all at once to the 12-liter flask. Directly thereafter, 17.5 g of tert-butylperoxy acetate (Luperox® 7M75 initiator from Atofina, Philadelphia, Pa.) and 108.4 g of xylene were fed to the 12-liter reactor over 220 minutes. Once the initiator feed was complete, an additional 19.4 g of Luperox® 7M75 initiator and 139.1 g of xylene were fed over half an hour. The 12-liter flask was held at reflux for 1 hour and cooled to 80° C. An additional 84.6 g of xylene were added to the 12-liter flask and the batch filled out.

The resulting copolymer@ 64.7% solids had a GPC Mn of 2683 and GPC Mw of 3386. The copolymer had an average number of 2.6 hydroxyl groups from the hydroxyethyl acrylate per polymer chain. The Tg of the copolymer was 25.6° C., using dynamic scanning calorimetry.

Comparative Copolymer 1 (Comp. Copolymer 1)

To a five-liter flask fitted with heating mantle, stirrer, condenser with 50 ml moisture receiver, nitrogen blanket, monomer and initiator feed lines, enough solvent (Aromatic 100 from ExxonMobil Chemical Chemical, Houston, Tex.) was added to completely fill the receiver. Then, 300.1 g of solvent (Aromatic 100) was added to the reaction flask and the flask was heated to reflux, followed by the addition of a monomer mixture consisting of 551.1 g of hydroxyethylmethacrylate (Rocryl® 400 monomer from Rohm and Haas Company, Philadelphia, Pa.) and 9459 isobornyl acrylate (Sipomer® HP from Rhodia Inc., Cranbury, N.J.) over a period of 240 minutes to the flask. Simultaneously with the monomer feed, an initiator feed consisting of 45 g of tertiarybutyl peroxyacetate (Luperox® 7M75 from Atofina, Philadelphia, Pa.) and 250.1 g of Aromatic 100 was added over a period of 270 minutes. Reflux at a temperature of approximately 169° C. was maintained over the entire reaction time. After completion of the initiator feed, the flask was cooled to 150° C. and 250.2 g of methyl N-amyl ketone (PM133 from Eastman Chemical, Kingsport, Tenn.) was added. The flask was further cooled to less than 80° C. and the contents poured out. The resulting copolymer (HEMA/IBOA//37/63) was at 70% solids, with a GPC Mn of 1637, and GPC Mw of 2978 using polystyrene as the standard. The average number of functionalities (hydroxyl) was 4.6 per polymer chain and the Tg of the copolymer was 41.05° C.

Comparative Copolymer 2 (Comp. Copolymer 2)

To a 2-liter flask fitted with an agitator, water condenser, thermocouple, nitrogen inlet, heating mantle, and addition pumps and ports was added 305.3 g of xylene, which was agitated and heated to reflux temperature (137 to 142° C.). A monomer mixture comprising of 106.1 grams styrene, 141.4 grams methyl methacrylate, 318.3 grams isobutyl methacrylate, 141.4 grams hydroxyethyl methacrylate and 10.4 g xylene was then added to the flask via the addition pumps and ports simultaneously with an initiator mixture comprising 17.0 grams t-butyl peracetate and 85.2 g xylene. The monomer mixture was added over 180 minutes and the addition time for the initiator mixture was also 180 minutes. The batch was held at reflux (137° C. to 142° C.) throughout the polymerization process. An initiator mixture comprising of 4.3 g t-butyl peracetate and 57.8 g of methyl ethyl ketone was then immediately added to the reaction mixture over 60 minutes and the batch was subsequently held at reflux for 60 minutes. The batch was then cooled to below 90° C. and 13.0 g of methyl ethyl ketone were added. The resulting polymer solution has weight solids of 60% and viscosity of 14,400 cps. The number average molecular weight of the resulting hydroxy functional acrylic copolymer was 5,000 and weight average molecular weight was 11,000, as determined by gel permeation chromatography (polystyrene standard).

Clear coating composition of the invention (Examples 1 through 5 and Comparative Examples 1 and 2) were prepared by adding the components listed in Table 1 below (all in parts by weight):

TABLE 1

| Composition Components | Ex. 1 | Ex. 2 | Ex. 3 | Comp. Ex. 1 | Comp. Ex. 2 |
|---|---|---|---|---|---|
| Crosslinkable Component | | | | | |
| Copolymer 3 | 43.71 | | | | |
| Copolymer 4 | | 43.63 | | | |
| Copolymer 5 | | | 44.32 | | |
| Comp. Compound 1* | | | | 22.39 | |
| Comp. Copolymer 1 | | | | | 36.83 |
| Solvent (butyl Acetate) | 4.61 | 4.69 | 3.69 | 11.39 | 7.93 |
| Flow Additive** | 0.58 | 0.58 | 0.59 | 0.32 | 0.51 |
| Catalyst*** | 2.90 | 2.90 | 2.93 | 1.62 | 2.56 |
| Crosslinking Component | | | | | |
| Tolonate ® HDT - LV (Isocyanurate Trimer of Hexamethylene Diisocyanate)**** | 14.27 | 14.27 | 14.27 | 14.27 | 14.27 |

*Comp. Copolymer (Reactive oligomer based on procedure # 2 in U.S. Pat. No. 6,221,494 B1) @ 80% weight solids in Methyl Amyl Ketone.
**10% BYK ® 301 Flow Additive from BYK-Chemie, Wallingford, Connecticut in propylene glycol monomethyl ether acetate.
***1% Di Butyl Tin Dilaurate in Methyl Ethyl Ketone.
****Supplied by Rhodia Chemicals, Inc., Cranbury, New Jersey.

The crosslinkable and crosslinking components listed in Table 1 above were mixed to form pot mixes, which were applied with a doctor blade over a separate phosphated cold roll steel panels primed with a layer of PowerCron® Primer supplied by PPG, Pittsburgh, Pa., to a dry coating thickness of 50 micrometers and air dried at ambient temperature conditions. Then the panels were tested using the tests set forth in following Table 2, which also includes the test results:

TABLE 2

| Properties & Tests | Comp. Ex. 1 PE/MH/EO | Comp. Ex. 2 IBOA/HEMA | Ex 1. IBOMA/HEA | Ex. 2 MMA/HEA | Ex. 3 MMA/HEA |
|---|---|---|---|---|---|
| | 964 | 70/30 | 70/30 | 70/30 | 70/30 |
| GPC Mn | 1054 | 1684 | 1935 | 2683 | 2683 |
| GPC Mw | 4.6 | 2893 | 2656 | 4198 | 3386 |
| Tg | 60 | 43.3 | 38.6 | 27.1 | 25.6 |
| Viscosity @ 60% Theoretical Solids (cps) | 242 | 200 | 135 | 710 | 450 |
| Equivalent Weight | 55 | 433 | 396 | 394 | 320 |
| Pot Life in minutes | 385 | 95 | 94 | 76 | 85 |
| BK3 Time in minutes | 255 | 231 | 111 | 83 | 83 |
| Cotton Tack Free Time in minutes | | 255 | 240 | 180 | 262 |
| Persoz Hardness (pz) 4 Hours @ Room Temp. | 16 | 41 | 24 | 24 | 26 |
| 1 day @ Room Temp. | 123 | 178 | 145 | 105 | 113 |
| Visual Appearance Fisher Hardness (FI) | Good | Good | Good | Good | Good |
| 1 day | 15.8 | 19 | 28 | 23 | 27 |
| 30 days | 59 | 172 | 115 | 75 | 82 |
| 30 days @ 3 mil | 58 | 82 | 68 | 18 | 15 |
| Water Spot Test - 4 hours @ Room Temp. | 7 | 8 | 8 | 9 | 8 |

TABLE 2-continued

| | Comp. Ex. 1 PE/MH/ EO | Comp. Ex. 2 IBOA/ HEMA | Ex 1. IBOMA/ HEA | Ex. 2 MMA/ HEA | Ex. 3 MMA/ HEA |
|---|---|---|---|---|---|
| Swell Ratio | | | | | |
| 1 day | 1.99 | 1.83 | 1.86 | 1.63 | 1.68 |
| 30 days | 1.61 | 1.63 | 1.58 | 1.57 | 1.65 |
| Gel Fraction - 30 day @ Room Temp. | 99.9 | 94.4 | 91.1 | 92.3 | 91.6 |

*The viscosity of copolymers.

In general the results of Table 2 show that the properties of Examples 1, 2 and 3 are comparable to the properties of Comparative Example 2. However, the results of Table 2 show that the properties of Examples 1, 2 and 3 show improved coating properties over that of Comparative Example 1.

The improved coating hardness and coating cure times provided by the coating compositions of the present invention over those provided by the coating compositions using functional oligomer Comparative Compound 1 will permit refinish body shops to sand and buff the clearcoats much earlier, thereby improving the body shop productivity. Moreover, these improved properties also allow a refinish formulator to include higher amounts of these copolymers in refinish coating compositions, thereby reducing the VOC in the resulting coating compositions without adversely affecting the coating properties.

Viscosity Test Comparison

Copolymers 3, 4, 5 and Comparative Copolymer 2 were reduced to 60% weight solids with a solvent blend of 80% Methyl amyl Ketone and 20% Methyl ethyl ketone. The results, shown in the Table 2, indicate that the viscosities of copolymers 1, 2 and 3 are much lower than those of a conventional acrylic copolymer, such as Comparative Copolymer 2, which had a viscosity at 60% solids of 14,400 cps.

Thus, it is clearly seen from the property and viscosity data of the copolymers of the present invention and the coating compositions made therefrom that these types of copolymers offer a significant advantage in lowering VOC as compared to conventional acrylic copolymers. Furthermore, the copolymers of the present invention also provide favorable film forming properties (early and final) when compared against the oligomers such as those described in # U.S. Pat. No. 6,221,494 B1.

What is claimed is:

1. A coating composition comprising crosslinkable and crosslinking components, wherein said crosslinkable component consists essentially of:
   a copolymer having on an average 2 to 25 crosslinkable groups selected from the group consisting of hydroxyl, acetoacetoxy, carboxyl, epoxy, primary and secondary amine, and a combination thereof; a weight average molecular weight ranging from about 1000 to 4500; a polydispersity ranging from about 1.05 to 2.5;
   wherein said copolymer is polymerized from a monomer mixture comprising one or more non-functional methacrylate monomers and one or more functional acrylate monomers provided with said functional groups, and wherein said crosslinking component for said crosslinkable groups is selected from the group consisting of polyisocyanate, polyamine, ketimine, melamine, epoxy, polyacid and a combination thereof.

2. The coating composition of claim 1 wherein when said copolymer has said hydroxyl functional groups said crosslinking component is polyisocyanate.

3. The coating composition of claim 1 wherein said non-functional methacrylate monomer is provided with a non-functional group selected from the group consisting of linear $C_1$ to $C_{20}$ alkyl, branched $C_3$ to $C_{20}$ alkyl, cyclic $C_3$ to $C_{20}$ alkyl, aromatic with 2 to 3 rings, phenyl and $C_1$ to $C_{20}$ fluorocarbon.

4. The coating composition of claim 1 wherein said copolymer has a Tg ranging from about −10° C. to 80° C.

5. The coating composition of claim 1 wherein said composition has a VOC ranging from 0.1 kilograms to 0.72 kilograms per liter.

6. The coating composition of claim 1 wherein said polyisocyanate is provided within the range of 2 to 10 isocyanate functionalities.

7. The coating composition of claim 1 wherein said crosslinkable component further comprises a catalyst selected from the group consisting of a tin compound, tertiary amine, acid catalyst and a combination thereof.

8. The coating composition of claim 1 wherein said composition is a clear coating composition, pigmented composition, metallized coating composition, basecoat composition, monocoat composition or a primer.

9. The coating composition of claim 1 wherein said monomer mixture further comprises acid monomers.

10. The coating composition of claim 1 wherein said monomer mixture further comprises 0.01% to 10% by weight of functional acrylate monomers.

11. The coating composition of claim 1 wherein said monomer mixture further comprises 0.01% to 10% by weight of non-functional methacrylate monomers.

12. The coating composition of claim 1 wherein said copolymer is produced by free radical polymerization of said monomer mixture at a polymerization temperature ranging from about 120° C. to 300° C.

13. The coating composition of claim 1 wherein the ratio of the non-functional methacrylate monomers to the functional acrylate monomers in the monomer mixture ranges from about 90:10::10:90.

14. The coating composition of claim 13 wherein said ratio ranges from about 75:25::25:75.

15. The coating composition of claim 3 wherein the ratio of the non-functional methacrylate monomers to the functional acrylate monomers in the monomer mixture ranges from about 90:10::10:90.

16. The coating composition of claim 15 wherein said ratio ranges from about 75:25::25:75.

17. The coating composition of claim 1 having a polydispersity ranging from 1.1 to 1.7.

18. The coating composition of claim 13 having a polydispersity ranging from 1.1 to 1.7.

19. The coating composition of claim 15 having a polydispersity ranging from 1.1 to 1.7.

20. The coating composition of claim 17 wherein said weight average molecular weight ranges from 1500 to 3500.

21. The coating composition of claim 19 wherein said weight average molecular weight ranges from 1500 to 3500.

22. The coating composition of claim 4 wherein said Tg ranges from about 10 C. to 60 C.

* * * * *